United States Patent
Kurata (10) Patent No.: US 12,394,409 B2
(45) Date of Patent: Aug. 19, 2025

(54) SEPARATING ACOUSTIC AND LINGUISTIC INFORMATION IN NEURAL TRANSDUCER MODELS FOR END-TO-END SPEECH RECOGNITION

(71) Applicant: INTERNATIONAL BUSINESS MACHINES CORPORATION, Armonk, NY (US)

(72) Inventor: Gakuto Kurata, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1007 days.

(21) Appl. No.: 17/478,064

(22) Filed: Sep. 17, 2021

(65) Prior Publication Data
US 2023/0104244 A1   Apr. 6, 2023

(51) Int. Cl.
*G10L 15/16* (2006.01)
*G10L 15/06* (2013.01)

(52) U.S. Cl.
CPC ............ *G10L 15/16* (2013.01); *G10L 15/063* (2013.01)

(58) Field of Classification Search
None
See application file for complete search history.

(56) References Cited

U.S. PATENT DOCUMENTS

2021/0343273 A1*  11/2021  Tripathi ................ G06N 20/00
2022/0310072 A1*  9/2022   Sainath ................ G10L 15/063

FOREIGN PATENT DOCUMENTS

WO   2020247489 A1   12/2020

OTHER PUBLICATIONS

Liu et. al. ; Improving RNN Transducer Based ASR with Auxiliary Tasks (Year: 2020).*
Wu et. al. : U2++: Unified Two-pass Bidirectional End-to-end Model for Speech Recognition (Year: 2021).*
Tian, Zhengkun, et al. "FSR: Accelerating the Inference Process of Transducer-Based Models by Applying Fast-Skip Regularization", arXiv preprint arXiv:2104.02882. Apr. 7, 2021, pp. 1-5.

(Continued)

*Primary Examiner* — Mandrita Brahmachari
(74) *Attorney, Agent, or Firm* — Tutunjian & Bitetto, P.C.; Robert Richard Aragona (57) ABSTRACT

A computer-implemented method is provided for training a Recurrent Neural Network Transducer (RNN-T). The method includes training, by inputting a set of audio data, a first RNN-T which includes a common encoder, a forward prediction network, and a first joint network combining outputs of both the common encoder and the forward prediction network. The forward prediction network predicts label sequences forward. The method further includes training, by inputting the set of audio data, a second RNN-T which includes the common encoder, a backward prediction network, and a second joint network combining outputs of both the common encoder and the backward prediction network. The backward prediction network predicts label sequences backward. The trained first RNN-T is used for inference.

18 Claims, 8 Drawing Sheets

(56) References Cited

OTHER PUBLICATIONS

Li, Jinyu, et al. "Improving RNN transducer modeling for end-to-end speech recognition", In2019 IEEE Automatic Speech Recognition and Understanding Workshop (ASRU). Sep. 26, 2019, pp. 1-8.

Sainath, Tara N., et al. "Improving the performance of online neural transducer models", In2018 IEEE International Conference on Acoustics, Speech and Signal Processing (ICASSP). Apr. 15, 2018, pp. 5864-5868.

Jeon, Jae-Jin, et al. "Multitask Learning and Joint Optimization for Transformer-RNN-Transducer Speech Recognition", InICASSP 2021-2021 IEEE International Conference on Acoustics, Speech and Signal Processing (ICASSP). Nov. 2, 2020, pp. 6793-6797.

Mell et al., "The NIST Definition of Cloud Computing", National Institute of Standards and Technology, Special Publication 800-145. Sep. 2011, pp. 1-7.

Sklyar, I., Piunova, A., & Liu, Y. (Feb. 19, 2021). Streaming multi-speaker ASR with RNN-T. In ICASSP 2021-2021 IEEE International Conference on Acoustics, Speech and Signal Processing (ICASSP) (pp. 6903-6907). IEEE.

Wu, D., Zhang, B., Yang, C., Peng, Z., Xia, W., Chen, X., & Lei, X. (Dec. 30, 2021). U2++: Unified two-pass bidirectional end-to-end model for speech recognition. arXiv preprint arXiv:2106.05642.

Kurata, G., & Saon, G. (Oct. 25, 2020). Knowledge Distillation from Offline to Streaming RNN Transducer for End-to-End Speech Recognition. In Interspeech (pp. 2117-2121).

Search Report from PCT/EP2022/074919 dated Nov. 30, 2022. (12 pages).

Liu et al. "Improving RNN Transducer Based ASR with Auxiliary Tasks", IEEE, Jan. 19, 2021, 9 pages.

\* cited by examiner

SEPARATING ACOUSTIC AND LINGUISTIC INFORMATION IN NEURAL TRANSDUCER MODELS FOR END-TO-END SPEECH RECOGNITION

BACKGROUND

The present invention generally relates to speech recognition, and more particularly to separating acoustic and linguistic information in neural transducer models for end-to-end speech recognition.

End-to-end speech recognition with neural transducers in which only one neural network models everything for speech recognition has various advantages both in training and inference. Purely end-to-end training only from transcripts and audio is possible. Only a beam search over one neural network is necessary for inference, resulting in smaller computational cost, smaller memory footprint, and simpler inference engine.

Training of neural transducer models is simple but has some disadvantages. For example, end-to-end training is prone to overfitting because one utterance can serve as only one sample. While neural transducer models include an encoder network that serves as an acoustic model, a prediction network that serves as a language model, and a joint network that combines acoustic and linguistic embeddings from the encoder and prediction networks, end-to-end training does not take such modularity into consideration. As a result, customization of neural transducers are more difficult than the conventional hybrid model in which acoustic and language models are separately trained and can be independently customized. Improved accuracy and more reactive customization are both critical to provide competitive service from the cloud. Hence, there is a need to (1) improve speech recognition accuracy by mitigating overfitting and (2) build a model that is more reactive to customization.

SUMMARY

According to aspects of the present invention, a computer-implemented method is provided for training a Recurrent Neural Network Transducer (RNN-T). The method includes training, by inputting a set of audio data, a first RNN-T which includes a common encoder, a forward prediction network, and a first joint network combining outputs of both the common encoder and the forward prediction network. The forward prediction network predicts label sequences forward. The method further includes training, by inputting the set of audio data, a second RNN-T which includes the common encoder, a backward prediction network, and a second joint network combining outputs of both the common encoder and the backward prediction network. The backward prediction network predicts label sequences backward. The trained first RNN-T is used for inference.

According to other aspects of the present invention, a computer program product is provided for training a Recurrent Neural Network Transducer (RNN-T). The computer program product includes a non-transitory computer readable storage medium having program instructions embodied therewith. The program instructions are executable by a computer to cause the computer to perform a method. The method includes training, by a processor device inputting a set of audio data, a first RNN-T which includes a common encoder, a forward prediction network, and a first joint network combining outputs of both the common encoder and the forward prediction network. The forward prediction network predicts label sequences forward. The method further includes training, by the processor device inputting the set of audio data, a second RNN-T which comprises the common encoder, a backward prediction network, and a second joint network combining outputs of both the common encoder and the backward prediction network. The backward prediction network predicts label sequences backward. The trained first RNN-T is used for inference.

According to yet other aspects of the present invention, a computer processing system is provided for training a Recurrent Neural Network Transducer (RNN-T). The system includes a memory device for storing program code. The system further includes a processor device operatively coupled to the memory device for running the program code to train, by inputting a set of audio data, a first RNN-T which includes a common encoder, a forward prediction network, and a first joint network combining outputs of both the common encoder and the forward prediction network. The forward prediction network predicts label sequences forward. The processor device further runs the program code to train, by inputting the set of audio data, a second RNN-T which includes the common encoder, a backward prediction network, and a second joint network combining outputs of both the common encoder and the backward prediction network. The backward prediction network predicts label sequences backward. The trained first RNN-T is used for inference.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

Embodiments of the present invention are directed to separating acoustic and linguistic information in neural transducer models for end-to-end speech recognition.

Embodiments of the present invention prepare an additional prediction network that predicts label sequences backward. Embodiments of the present invention conduct multi-task training of the neural transducers with the original forward prediction network and the additional backward prediction network. The same encoder network is used during the multi-task learning. Only the original forward prediction network is used for actual tests (inference stage).

In embodiments of the present invention, the encoder network is jointly trained with both forward and backward prediction networks and thus does not capture the linguistic information as a result. Exemplary benefits of this method at least include: (1) Overfitting to the training data is mitigated; and (2) The linguistic information and the acoustic information are more separately captured in the prediction and the encoder networks. Resultingly, customization of prediction and encoder networks is more reactive.

Figure 1:
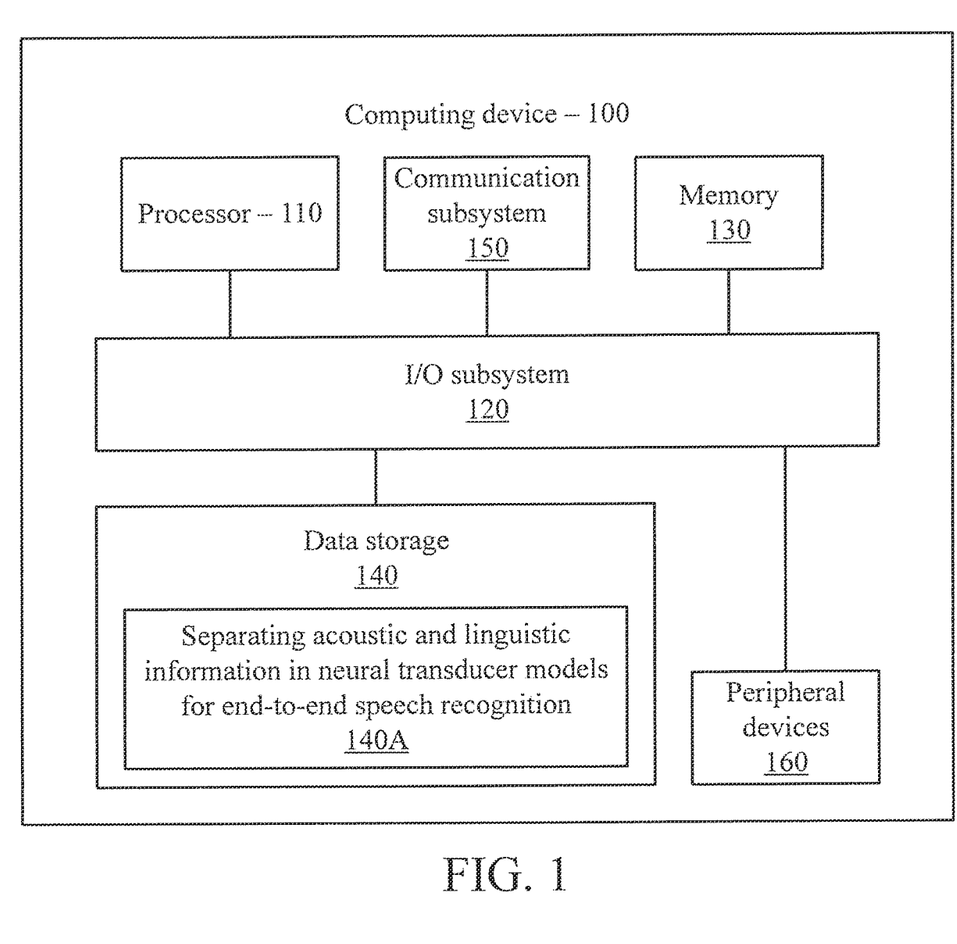
FIG. 1 is a block diagram showing an exemplary computing device, in accordance with an embodiment of the present invention.

FIG. 1 is a block diagram showing an exemplary computing device 100, in accordance with an embodiment of the present invention. The computing device 100 is configured to separate acoustic and linguistic information in neural transducer models for end-to-end speech recognition. In this way, customization of the prediction and encoder networks (see FIG. 2) is more reactive.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for separating acoustic and linguistic information in neural transducer models for end-to-end speech recognition. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. Further, in another embodiment, a cloud configuration can be used (e.g., see FIGS. 7-8). These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
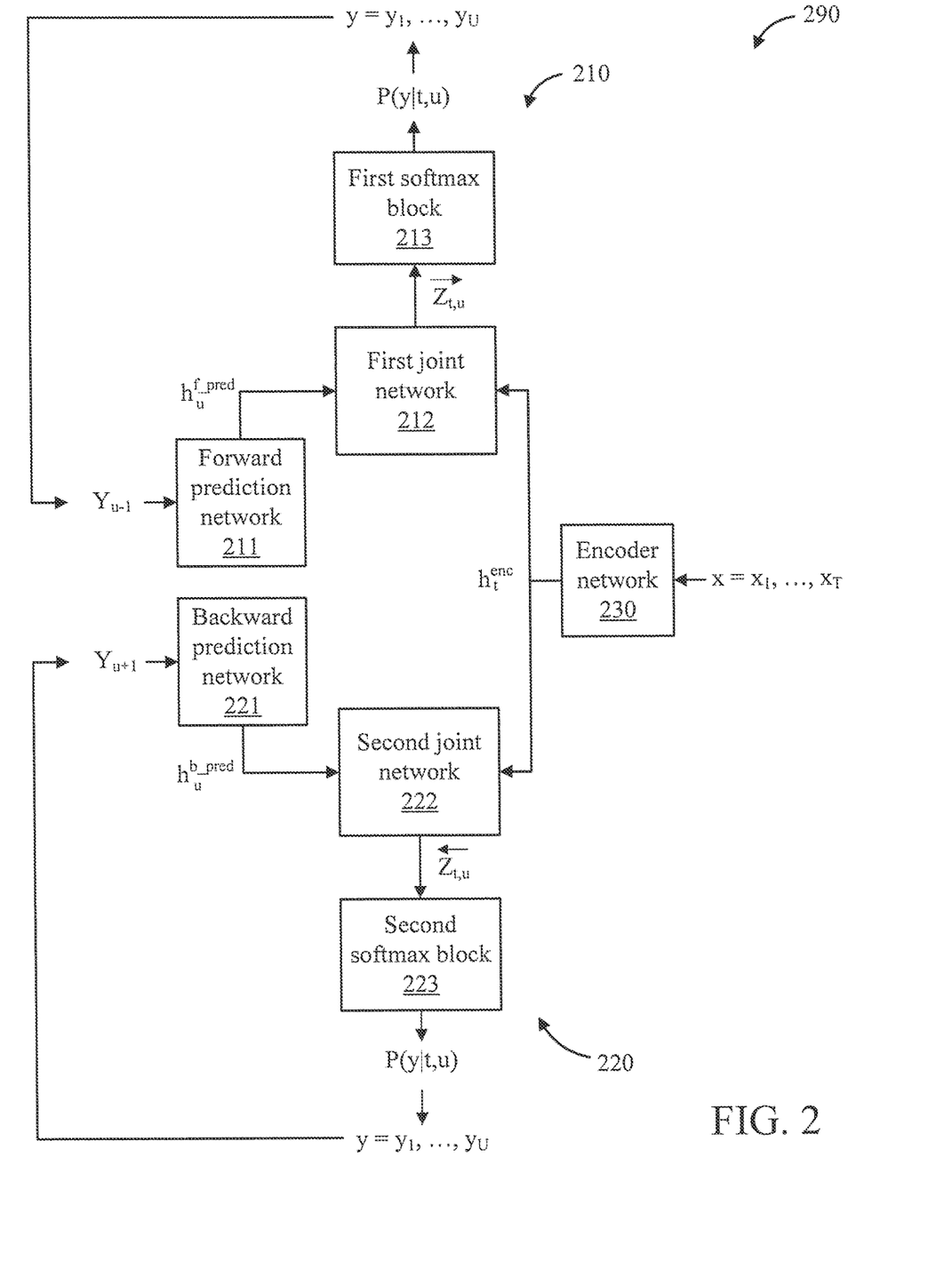
FIG. 2 shows an exemplary neural transducer architecture, in accordance with an embodiment of the present invention.

These and other variations of a hardware processor subsystem are also contemplated in accordance with embodiments of the present invention FIG. 2 shows an exemplary neural transducer architecture 200, in accordance with an embodiment of the present invention.

The neural transducer architecture 200 includes a first Recurrent Neural Network Transducer (RNN-T) 210 and a second RNN-T 220.

The first RNN-T 210 includes a common encoder 230, a forward prediction network 211, a first joint network (hereinafter "joint network" in short) 212, and a softmax block 213. The forward prediction network 211 predicts label sequences in a forward direction. The joint network 212 combines outputs of both the common encoder 230 and the forward prediction network 211. The forward prediction network 211, the joint network 212, and the softmax block 213 can be considered to form a first decoder network 219.

The second RNN-T 220 includes the common encoder 230, a backward prediction network 221, a second joint network (hereinafter "joint network" in short) 222, and a softmax block 223. The backward prediction network 221 predicts label sequences in a backward direction. The joint network 222 combines outputs of both the common encoder 230 and the backward prediction network 221. The backward prediction network 221, the joint network 222, and the softmax block 223 can be considered to form a second decoder network 229.

The common encoder 230 serves as an acoustic model. The forward prediction network 211 and the backward prediction network 221 serve as language models. The joint network 212 combines acoustic and linguistic embeddings from the encoder 230 and the forward prediction network 211. The joint network 222 combines acoustic and linguistic embeddings from the encoder 230 and the backward prediction network 221.

The trained first RNN-T 210 is used for inference.

The encoder 230 takes $X_{i \ldots T}$ as input, and outputs $h_t^{enc}$.

The forward prediction network 211 takes $Y_{u-1}$ as input, and outputs $h_u^{f\_pred}$.

The joint network 212 takes $h_u^{f\_pred}$ and $h_t^{enc}$ as inputs, and outputs $\overrightarrow{Z_{t,u}}$.

The softmax block 213 takes $\overrightarrow{Z_{t,u}}$ as input, and outputs P(y|t,u).

The backward prediction network 221 takes $Y_{u+1}$ as input, and outputs $h_u^{b\_pred}$.

The joint network 222 takes $h_u^{b\_pred}$ and $h_t^{enc}$ as inputs, and outputs $\overleftarrow{Z_{t,u}}$..

The softmax block 223 takes $\overleftarrow{Z_{t,u}}$ as input, and outputs P(y|t,u).

In FIG. 2, the following notations apply:

$X_i$ denotes an i-th input feature of an acoustic sequence, with T denoting a sequence length (X: $x_1 \ldots x_T$);

$Y_{u-1}$ denotes predicted output character symbols in a forward direction;

$Y_{u+1}$ denotes predicted output character symbols in a backward direction;

$h_t^{enc}$ denotes an embedding vector sequence of an input feature;

$h_u^{f\_pred}$ denotes an embedding with conditioning on the forward predictions;

$h_u^{b\_pred}$ denotes an embedding with conditioning on the backward predictions;

$\overrightarrow{Z_{t,u}}$ denotes an embedding of the joint network 212 by combining the output from the forward prediction network 211 and the output from the encoder network 230;

$\overleftarrow{Z_{t,u}}$ denotes an embedding of the joint network 222 by combining the output from the backward prediction network 221 and the output from the encoder network 230;

P(y|t,u) denotes a posterior distribution over a set of characters;

$Y=(y_1, \ldots, y_U)$ denotes an output set of characters in a forward direction;

$Y=(y_U, \ldots, y_1)$ denotes an output set of characters in a backward direction.

Figure 3:
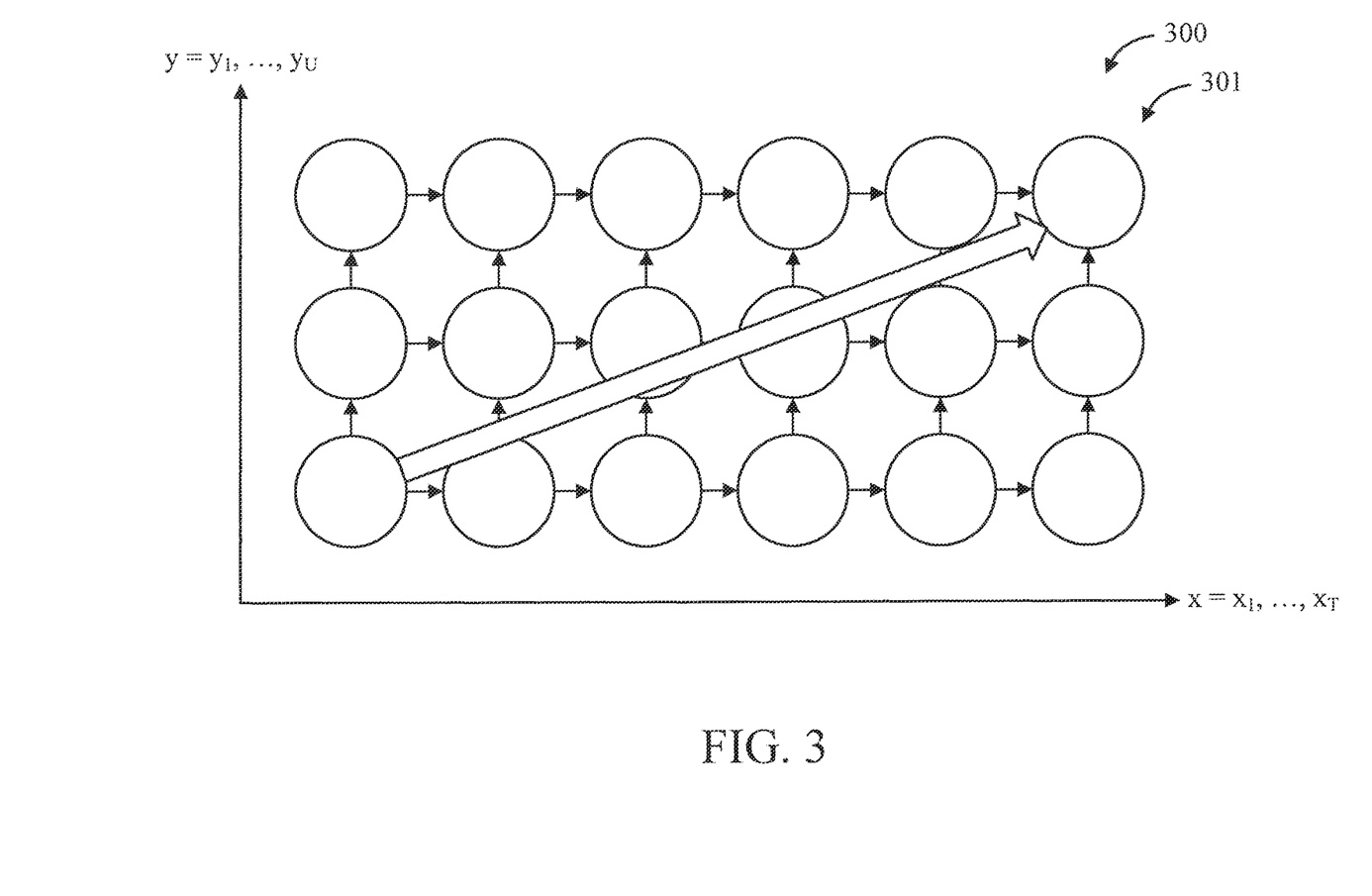
FIG. 3 is a diagram showing an exemplary trellis search in the forward direction, in accordance with an embodiment of the present invention.

FIG. 3 is a diagram showing an exemplary trellis search 300 in the forward direction, in accordance with an embodiment of the present invention.

The trellis search 300 has a x direction and a y direction. The x direction corresponds to the input sequence $x=(x_1, \ldots, X_T)$. The y direction corresponds to the forward output sequence $Y=(y_1, \ldots, y_U)$. Each node in the trellis 301 represents a softmax of $\overrightarrow{Z_{t,u}}$ by the softmax block 213.

Figure 4:
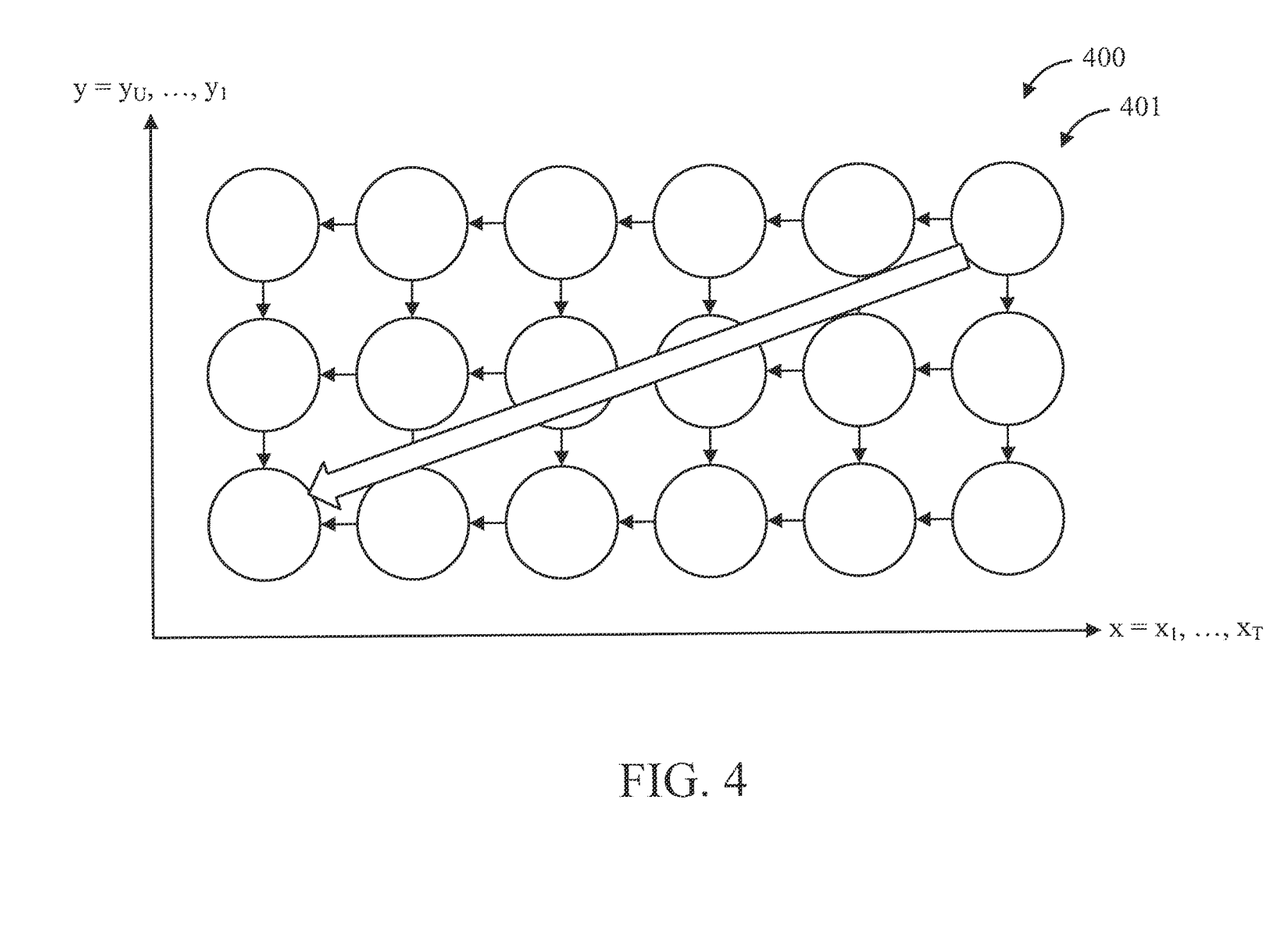
FIG. 4 is a diagram showing an exemplary trellis search in the backward direction, in accordance with an embodiment of the present invention.

FIG. 4 is a diagram showing an exemplary trellis search 400 in the backward direction, in accordance with an embodiment of the present invention.

The trellis search 400 has a x direction and a y direction. The x direction corresponds to the input sequence $x=(x_1, \ldots, X_T)$. The y direction corresponds to the output sequence $Y=(y_1, \ldots, y_U)$. Each node in the trellis 401 represents a softmax of $\overleftarrow{Z_{t,u}}$ by the softmax block 223.

Figure 5:
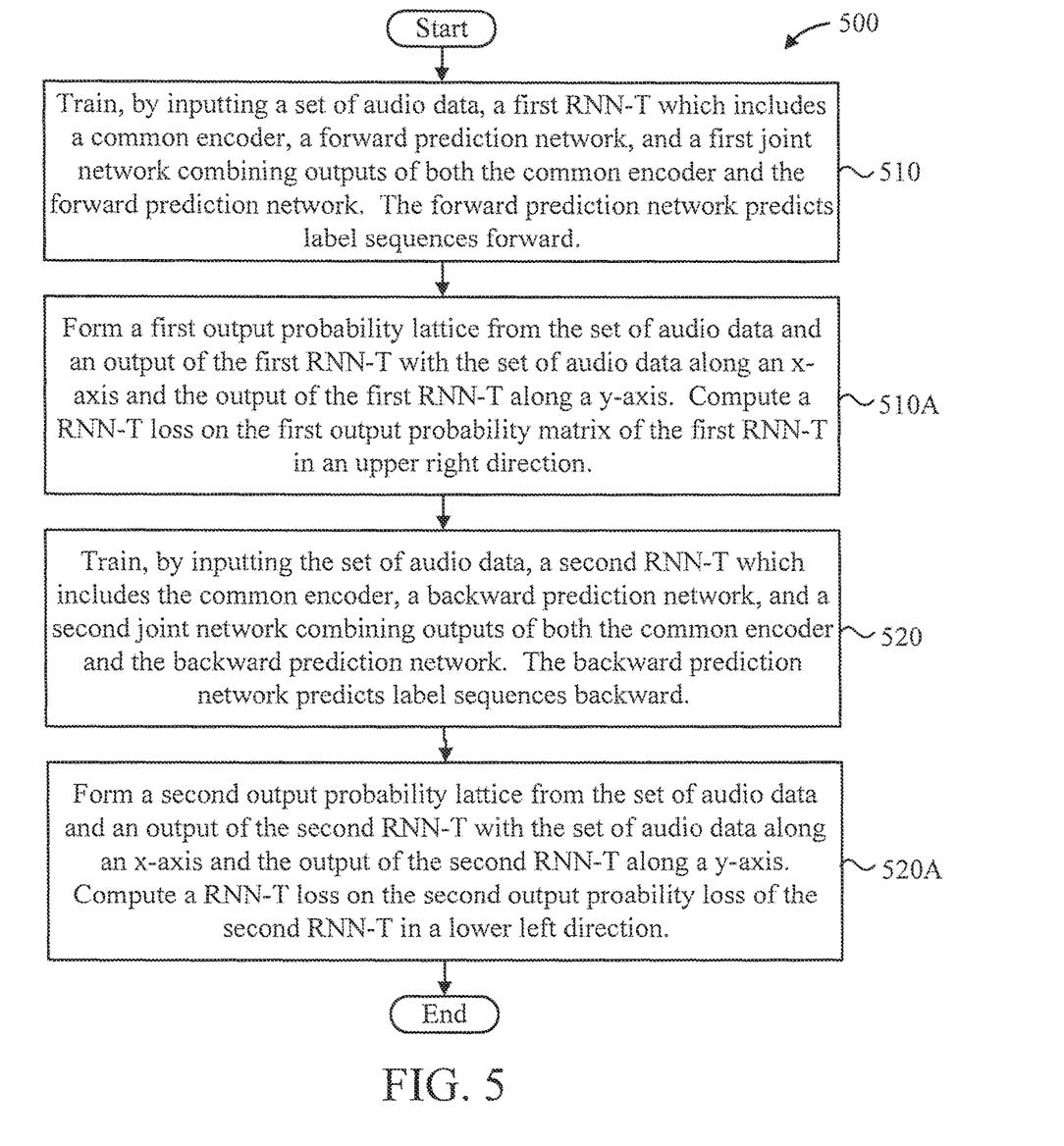
FIG. 5 is a flow diagram showing an exemplary method for training a Recurrent Neural Network Transducer (RNN-T), in accordance with an embodiment of the present invention.

FIG. 5 is a flow diagram showing an exemplary method 500 for training a Recurrent Neural Network Transducer (RNN-T), in accordance with an embodiment of the present invention.

At block 510, train, by inputting a set of audio data, a first RNN-T which includes a common encoder, a forward prediction network, and a first joint network combining outputs of both the common encoder and the forward prediction network. The forward prediction network predicts label sequences forward.

In an embodiment, block 510 can include block 510A.

At block 510A, form a first output probability lattice from the set of audio data and an output of the first RNN-T with the set of audio data along an x-axis and the output of the first RNN-T along a y-axis. Compute a RNN-T loss on the first output probability lattice of the first RNN_T in an upper right direction.

At block 520, train, by inputting the set of audio data, a second RNN-T which includes the common encoder, a backward prediction network, and a second joint network combining outputs of both the common encoder and the backward prediction network. The backward prediction network predicts label sequences backward. The first RNN-T and the second RNN-T form the RNN-T. The training steps jointly train the forward prediction network and the backward prediction network while ignoring and without capturing linguistic information. The common encoder network is combined with the forward and backward prediction network. Thus the common encoder must not capture word sequence (linguistic) information. Word sequence information needs to be captured by the forward and the backward prediction networks. Only the acoustic information should be captured by the encoder network. The trained first RNN-T is used for inference.

In an embodiment, block 520 can include block 520A.

At block 520A, form a second output probability lattice from the set of audio data and an output of the second RNN-T with the set of audio data along an x-axis and the output of the second RNN-T along a y-axis. Compute a RNN-T loss on the second output probability loss of the second RNN-T in a lower left direction.

Figure 6:
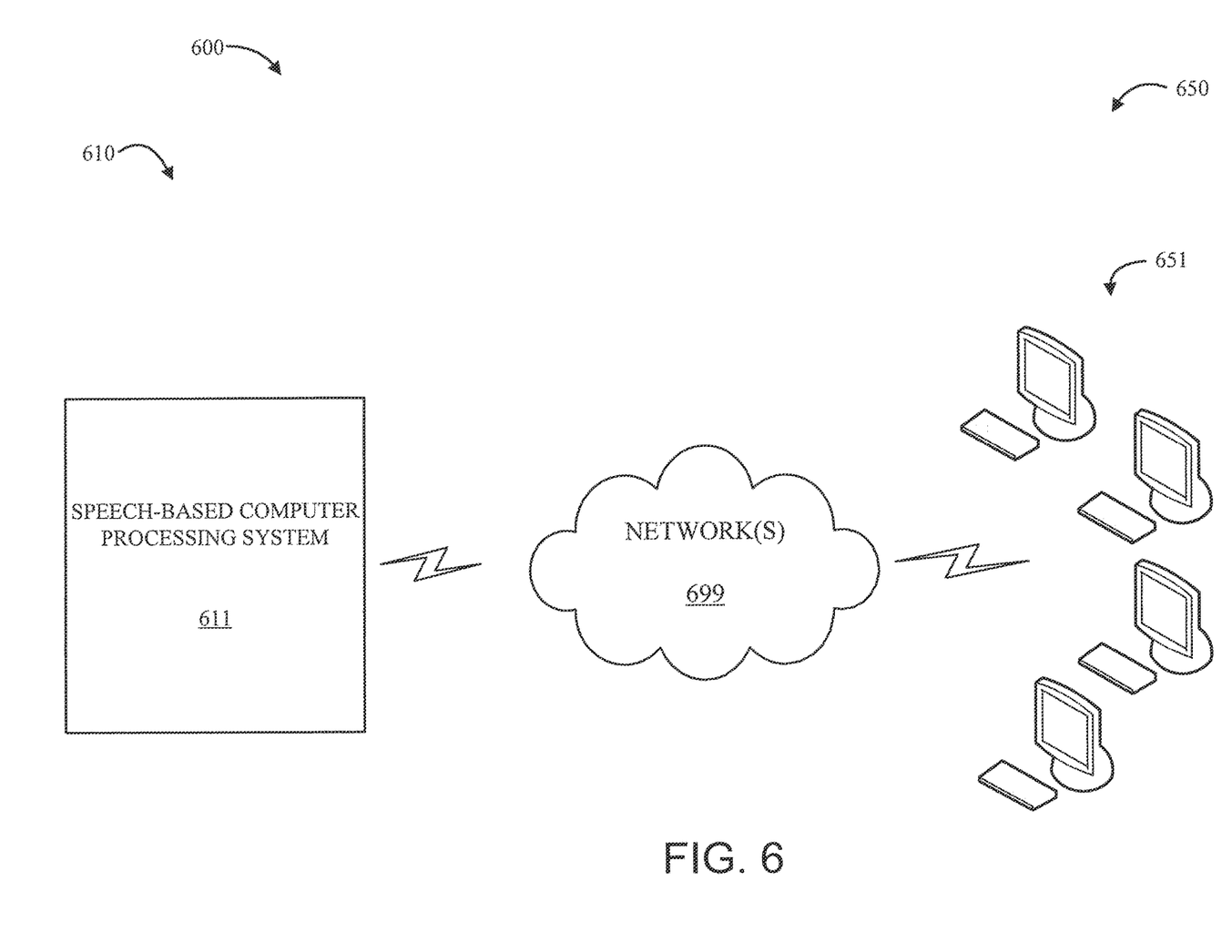
FIG. 6 shows an exemplary operating environment, in accordance with an embodiment of the present principles.

FIG. 6 shows an exemplary operating environment 600, in accordance with an embodiment of the present principles.

The environment 600 involves a server side 610 and a client side 650.

The server side 610 includes a speech-based computer processing system. For illustrative purposes, the speech-based computer processing system is an end-to-end speech recognition system 611. The end-to-end speech recognition system 611 has improved speech recognition accuracy in accordance with the present principles. It is to be appreciated that block 611 can represent any speech-based computer processing system that involves one or more of the following: speech recognition; speaker identification; speaker verification; speaker diarisation; language identification; keyword spotting; emotion detection; automatic translation; court reporting; hands-free computing; home automation; mobile telephony; and so forth.

The client side 650 includes a set of workstations 651.

Users at the workstations 651 can engage in and/or otherwise use speech recognition sessions. The speech recognition sessions can relate, but are not limited to, customer service, voice dialing, machine control, data searching, data entry, system/facility/entity access, and so forth.

Communications between the server side 610 and the client side 650 are made through one or more networks 699. In an embodiment, the server side 610 is realized using a cloud configuration.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
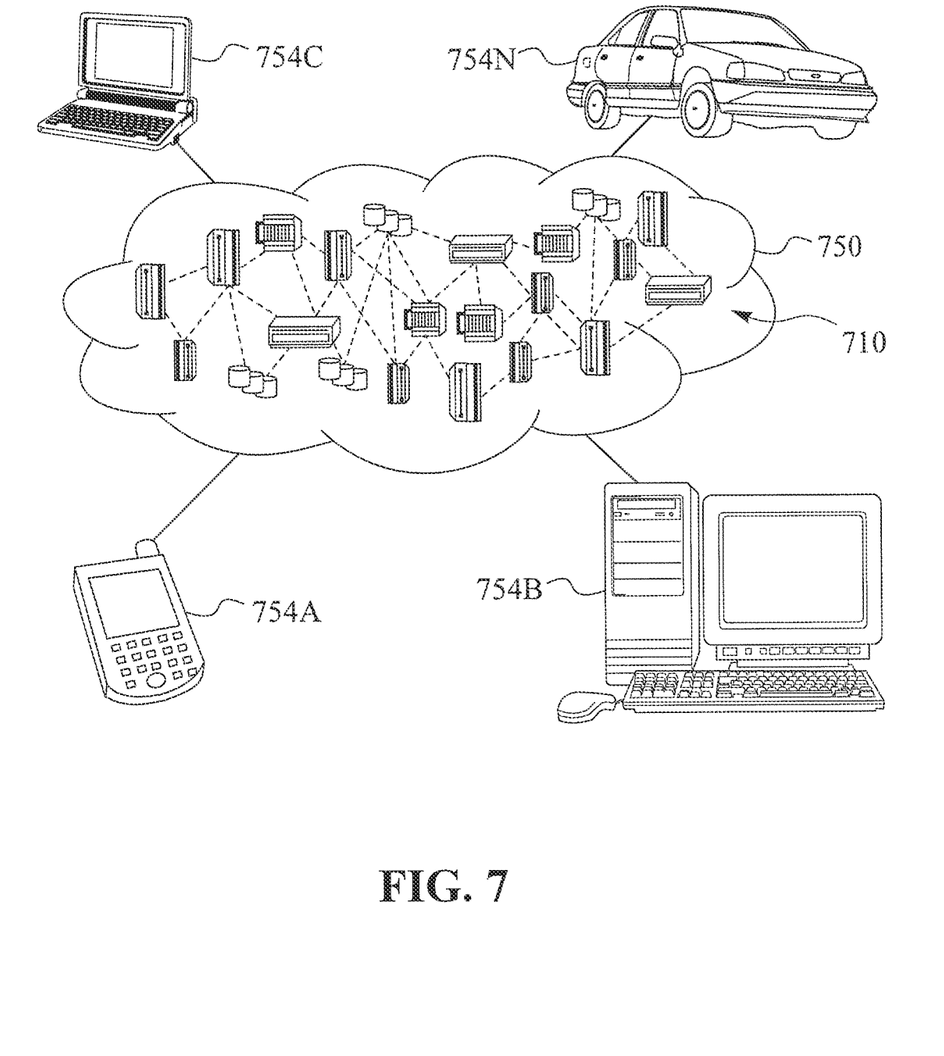
FIG. 7 is a block diagram showing an illustrative cloud computing environment having one or more cloud computing nodes with which local computing devices used by cloud consumers communicate, in accordance with an embodiment of the present invention.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
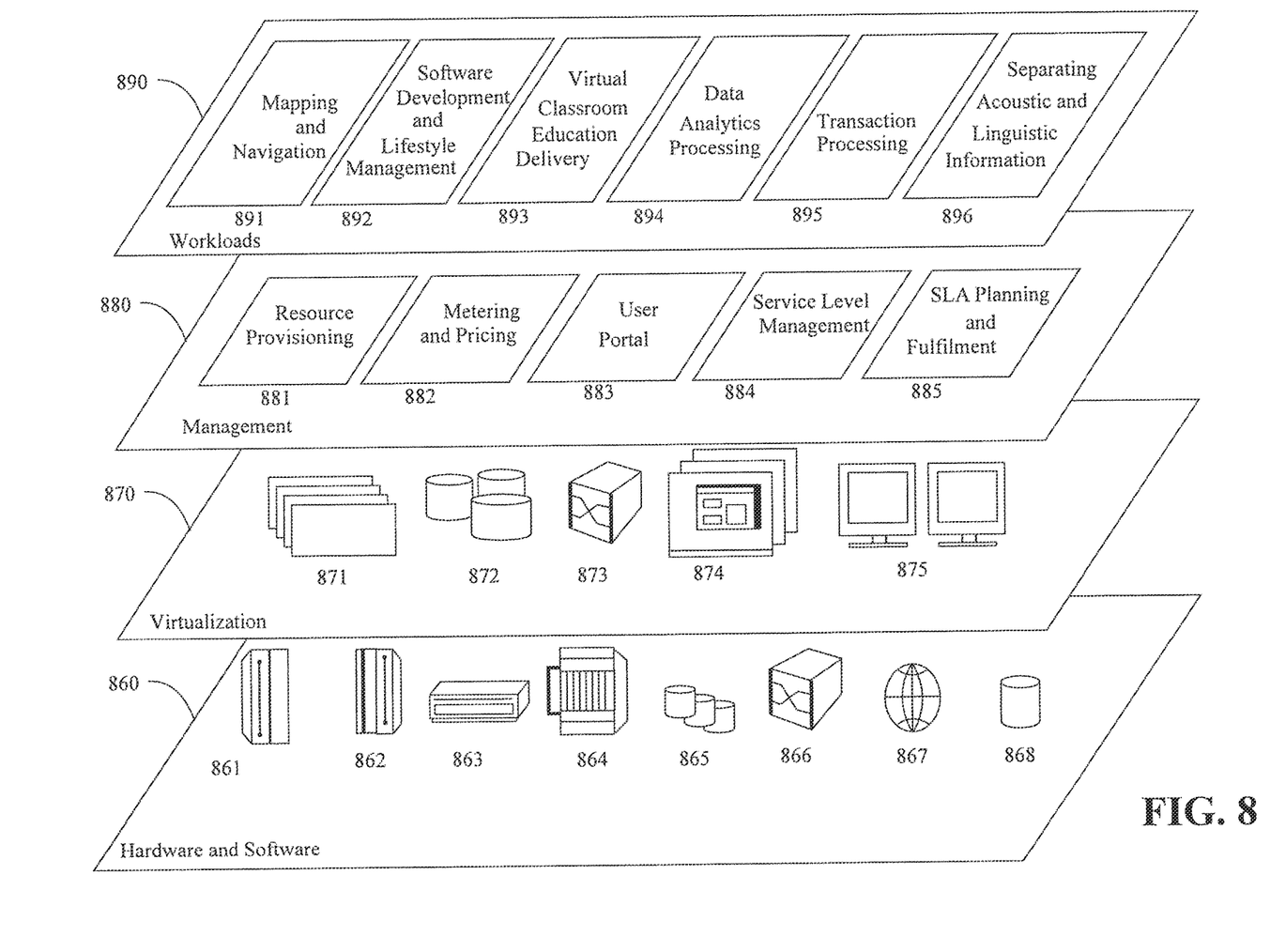
FIG. 8 is a block diagram showing a set of functional abstraction layers provided by a cloud computing environment, in accordance with an embodiment of the present invention.

Referring now to FIG. 8, a set of functional abstraction layers provided by cloud computing environment 750 (FIG. 7) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 792; virtual classroom education delivery 893; data analytics processing 894; transaction processing 795; and separating acoustic and linguistic information in neural network models for end-to-end speech recognition 896.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as SMALLTALK, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for training a Recurrent Neural Network Transducer (RNN-T), the method comprising:

training, by inputting a set of audio data, a first RNN-T which comprises a common encoder, a forward prediction network, and a first joint network combining outputs of both the common encoder and the forward prediction network, wherein the forward prediction network predicts label sequences forward, wherein training the first RNN-T includes forming a first output probability lattice from the set of audio data and an output of the first RNN-T with the set of audio data along an x-axis and the output of the first RNN-T along a y-axis and computing a RNN-T loss on the first output probability matrix in an upper right direction; and training, by inputting the set of audio data, a second RNN-T which comprises the common encoder, a backward prediction network, and a second joint network combining outputs of both the common encoder and the backward prediction network, wherein the backward prediction network predicts label sequences backward, and wherein the trained first RNN-T is used for inference.

2. The computer-implemented method of claim 1, wherein the training steps jointly train the forward prediction network and the backward prediction network while ignoring and without capturing linguistic information.

3. The computer-implemented method of claim 1, wherein a same encoding from the common encoder is used to jointly train the first RNN-T and the second RNN-T.

4. The computer-implemented method of claim 1, wherein the first RNN-T comprises a softmax layer and the method further comprises applying a softmax operation to an output of the first joint network.

5. The computer-implemented method of claim 1, wherein the second RNN-T comprises a softmax layer and the method further comprises applying a softmax operation to an output of the second joint network.

6. The computer-implemented method of claim 1, wherein each node of the first output probability lattice represents a softmax of an output of the first joint network corresponding to a forward direction.

7. The computer-implemented method of claim 1, wherein training the second RNN-T comprises forming a second output probability lattice from the set of audio data and an output of the second RNN-T with the set of audio data along an x-axis and the output of the second RNN-T along a y-axis, wherein the method further comprises computing a RNN-T loss on the second probability matrix in a lower left direction.

8. The computer-implemented method of claim 7, wherein each node of the second output probability lattice represents a softmax of an output of the second joint network corresponding to a backward direction.

9. A computer program product for training a Recurrent Neural Network Transducer (RNN-T), the computer program product comprising a non-transitory computer readable storage medium having program instructions embodied therewith, the program instructions executable by a computer to cause the computer to perform a method comprising:

training, by a processor device inputting a set of audio data, a first RNN-T which comprises a common encoder, a forward prediction network, and a first joint network combining outputs of both the common encoder and the forward prediction network, wherein the forward prediction network predicts label sequences forward, wherein training the first RNN-T includes forming a first output probability lattice from the set of audio data and an output of the first RNN-T with the set of audio data along an x-axis and the output of the first RNN-T along a y-axis and computing a RNN-T loss on the first output probability matrix in an upper right direction; and training, by the processor device inputting the set of audio data, a second RNN-T which comprises the common encoder, a backward prediction network, and a second joint network combining outputs of both the common encoder and the backward prediction network, wherein the backward prediction network predicts label sequences backward, and wherein the trained first RNN-T is used for inference.

10. The computer program product of claim 9, wherein the training steps jointly train the forward prediction network and the backward prediction network while ignoring and without capturing linguistic information.

11. The computer program product of claim 9, wherein a same encoding from the common encoder is used to jointly train the first RNN-T and the second RNN-T.

12. The computer program product of claim 9, wherein the first RNN-T comprises a softmax layer and the method further comprises applying a softmax operation to an output of the first joint network.

13. The computer program product of claim 9, wherein the second RNN-T comprises a softmax layer and the method further comprises applying a softmax operation to an output of the second joint network.

14. The computer program product of claim 9, wherein each node of the first output probability lattice represents a softmax of an output of the first joint network corresponding to a forward direction.

15. The computer program product of claim 9, wherein training the second RNN-T comprises forming a second output probability lattice from the set of audio data and an output of the second RNN-T with the set of audio data along an x-axis and the output of the second RNN-T along a y-axis, wherein the method further comprises computing a RNN-T loss on the second probability matrix in a lower left direction.

16. The computer program product of claim 15, wherein each node of the second output probability lattice represents a softmax of an output of the second joint network corresponding to a backward direction.

17. A computer processing system for training a Recurrent Neural Network Transducer (RNN-T), the system comprising:

a memory device for storing program code; and a processor device operatively coupled to the memory device for running the program code to train, by inputting a set of audio data, a first RNN-T which comprises a common encoder, a forward prediction network, and a first joint network combining outputs of both the common encoder and the forward prediction network, wherein the forward prediction network predicts label sequences forward, wherein training the first RNN-T includes forming a first output probability lattice from the set of audio data and an output of the first RNN-T with the set of audio data along an x-axis and the output of the first RNN-T along a y-axis and computing a RNN-T loss on the first output probability matrix in an upper right direction; and train, by inputting the set of audio data, a second RNN-T which comprises the common encoder, a backward prediction network, and a second joint network combining outputs of both the common encoder and the backward prediction network, wherein the backward prediction network predicts label sequences backward, and wherein the trained first RNN-T is used for inference.

18. The computer processing system of claim 17, wherein a same encoding from the common encoder is used to jointly train the first RNN-T and the second RNN-T.

* * * * *